(12) United States Patent
Erickson

(10) Patent No.: US 11,313,495 B1
(45) Date of Patent: Apr. 26, 2022

(54) RIGID HOSE FOR WET/DRY VACUUM

(71) Applicant: Darryl Erickson, Manchester, NH (US)

(72) Inventor: Darryl Erickson, Manchester, NH (US)

( * ) Notice: Subject to any disclaimer, the term of this patent is extended or adjusted under 35 U.S.C. 154(b) by 41 days.

(21) Appl. No.: 16/890,034

(22) Filed: Jun. 2, 2020

(51) Int. Cl.
*F16L 11/10* (2006.01)

(52) U.S. Cl.
CPC ..................... *F16L 11/10* (2013.01)

(58) Field of Classification Search
CPC ........................................ F16L 11/10
USPC ................................. 138/110, 106
See application file for complete search history.

(56) References Cited

U.S. PATENT DOCUMENTS

| | | | |
|---|---|---|---|
| 2,769,999 A | 11/1956 | Sheahan | |
| 4,188,081 A | 2/1980 | Holden | |
| 5,784,757 A | 7/1998 | Cipolla | |
| 6,588,052 B2 | 7/2003 | Iversen | |
| 6,626,210 B2* | 9/2003 | Luettgen | E03C 1/021 138/120 |
| 6,733,046 B1 | 5/2004 | Reif | |
| 7,066,497 B2 | 6/2006 | Fullbeck | |
| 7,147,007 B2* | 12/2006 | Renaud | F16L 11/111 138/121 |
| 7,389,961 B1* | 6/2008 | Haws | B05B 14/00 248/75 |
| 7,874,041 B2 | 1/2011 | Buller | |
| 7,891,382 B2* | 2/2011 | Rushlander | F16L 11/08 138/121 |
| 9,046,193 B1* | 6/2015 | Cook | F16L 3/015 |
| 9,420,751 B2* | 8/2016 | Akana | A01G 7/06 |
| 9,556,989 B2* | 1/2017 | O'Neil | F16L 21/065 |
| 10,377,327 B1* | 8/2019 | Katoh | H02G 11/00 |
| 2001/0034924 A1* | 11/2001 | Bozic | F16L 35/00 16/404 |
| 2005/0011568 A1* | 1/2005 | Kagenow | A61M 25/02 138/110 |
| 2005/0115018 A1 | 6/2005 | Jeon | |
| 2007/0157425 A1 | 7/2007 | Battle | |
| 2008/0179881 A1 | 7/2008 | Crocket | |
| 2009/0194186 A1* | 8/2009 | Gross | F16L 3/1226 138/110 |

FOREIGN PATENT DOCUMENTS

GB      2368266      6/2004

* cited by examiner

*Primary Examiner* — Craig M Schneider
*Assistant Examiner* — David R Deal
(74) *Attorney, Agent, or Firm* — Kyle A. Fletcher, Esq.

(57) ABSTRACT

The rigid hose for wet dry vacuum is configured for use with the hose of a domestic appliance. The rigid hose for wet dry vacuum is a protective structure. The rigid hose for wet dry vacuum protects the hose. The rigid hose for wet dry vacuum sets the hose in a fixed position such that the curvature of the center axis of the prism structure of the hose will not shift during use of the hose. The rigid hose for wet dry vacuum comprises a bimodal shell. The bimodal shell is a bimodal flexible structure.

18 Claims, 3 Drawing Sheets

RIGID HOSE FOR WET/DRY VACUUM

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of domestic appliances including suction cleaners, more specifically, a framework configured for use with a hose. (A47L9/24)

SUMMARY OF INVENTION

The rigid hose for wet dry vacuum is a mechanical structure. The rigid hose for wet dry vacuum is configured for use with the hose of a domestic appliance. The rigid hose for wet dry vacuum is a protective structure. The rigid hose for wet dry vacuum protects the hose. The rigid hose for wet dry vacuum sets the hose in a fixed position such that the curvature of the center axis of the prism structure of the hose will not shift during use of the hose. The rigid hose for wet dry vacuum comprises a bimodal shell. The bimodal shell is a bimodal flexible structure. In the first potential embodiment of the disclosure, the bimodal shell: a) forms a protected space that prevents the rigid hose from kinking when in use; and, b) forms a non-Euclidean prism structure that maintains the center axis of the prism structure of the hose in a fixed position. In a second potential embodiment of the disclosure, the rigid hose for wet dry vacuum further comprises a plurality of c-clips. The plurality of c-clips attach to the exterior surface of the bimodal shell. The hose attaches to the plurality of c-clips such that the center axis of the hose is held in a non-Euclidean prism structure.

These together with additional objects, features and advantages of the rigid hose for wet dry vacuum will be readily apparent to those of ordinary skill in the art upon reading the following detailed description of the presently preferred, but nonetheless illustrative, embodiments when taken in conjunction with the accompanying drawings.

In this respect, before explaining the current embodiments of the rigid hose for wet dry vacuum in detail, it is to be understood that the rigid hose for wet dry vacuum is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the rigid hose for wet dry vacuum.

It is therefore important that the claims be regarded as including such equivalent construction insofar as they do not depart from the spirit and scope of the rigid hose for wet dry vacuum. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
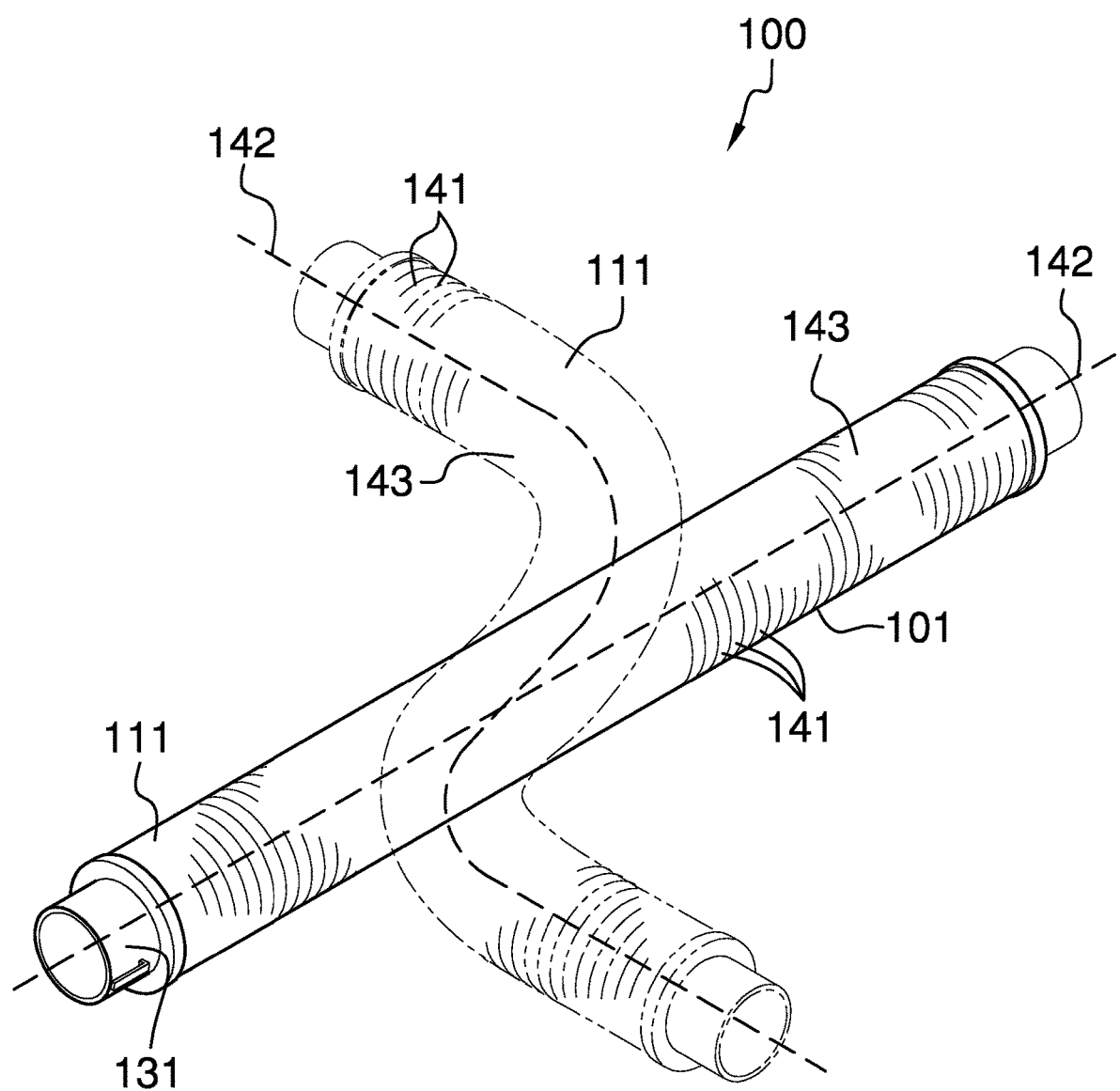
FIG. 1 is a perspective view of an embodiment of the disclosure.
Figure 2:
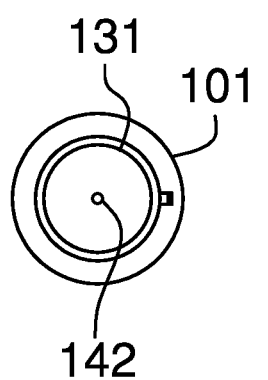
FIG. 2 is a top view of an embodiment of the disclosure.
Figure 3:
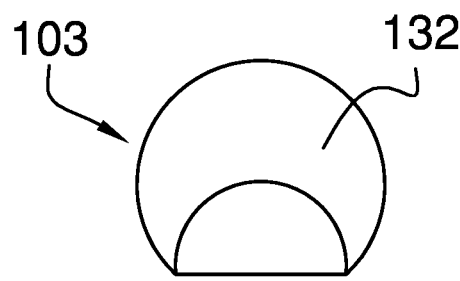
FIG. 3 is a side view of an embodiment of the disclosure.
Figure 3:
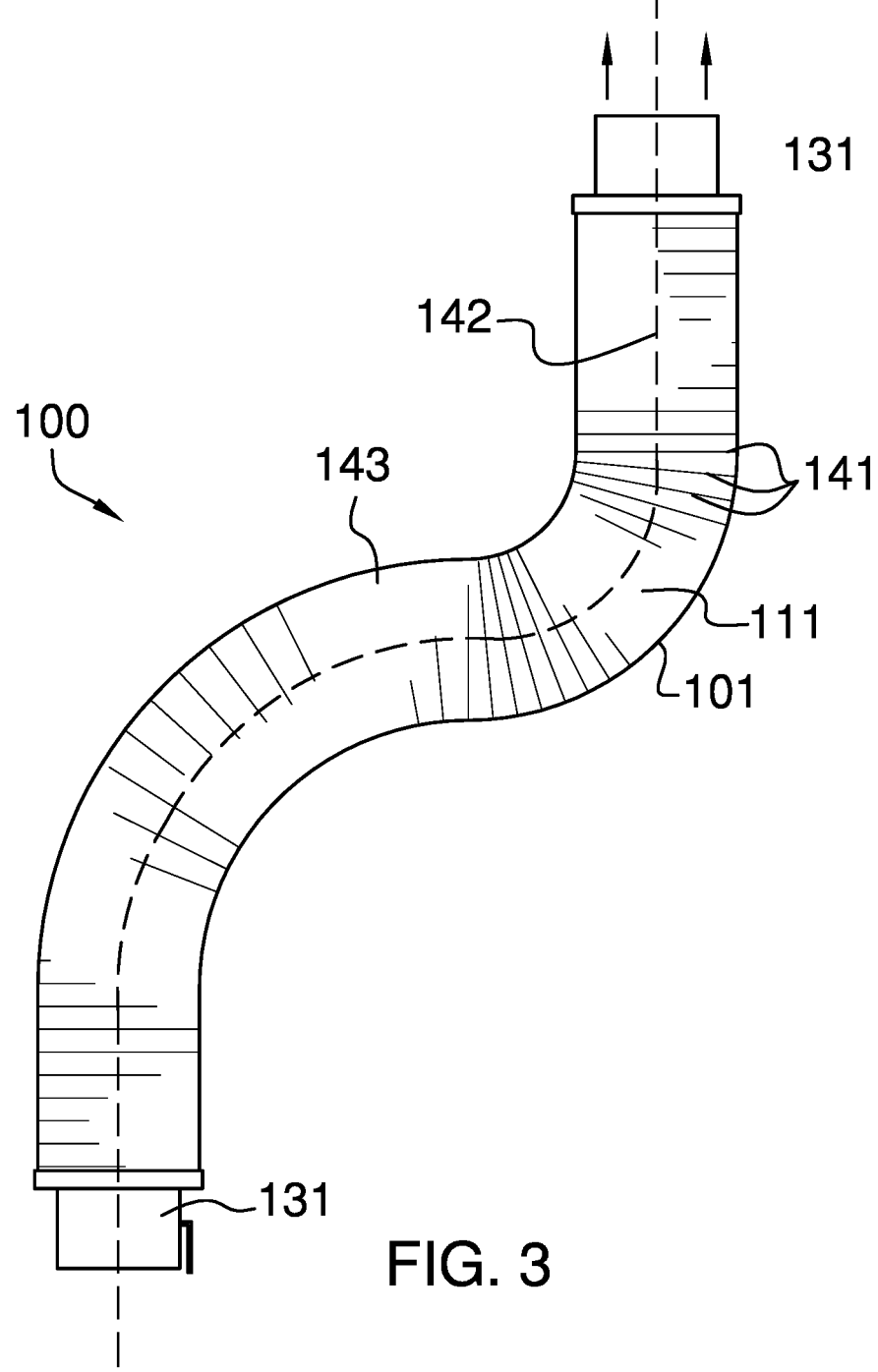
Figure 4:
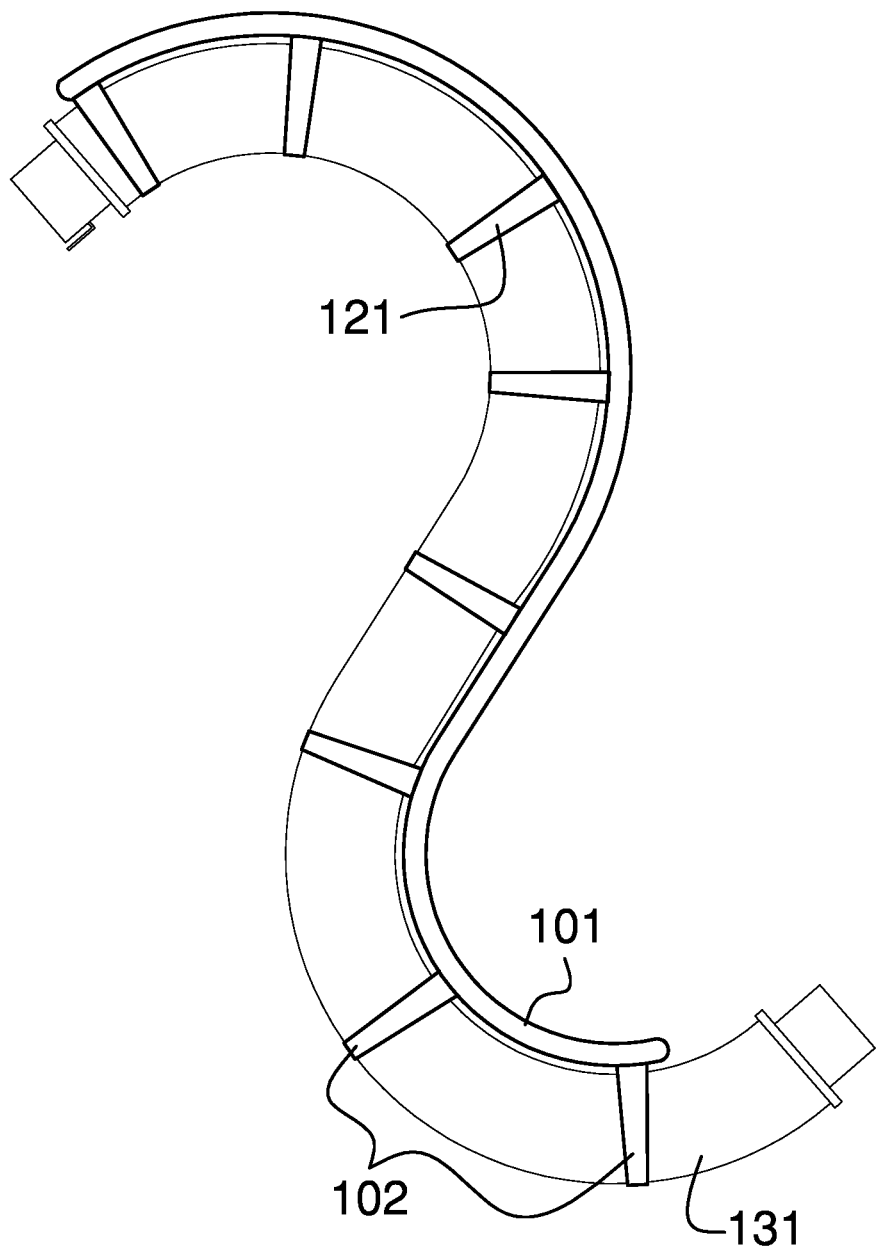
FIG. 4 is a front view of an embodiment of the disclosure.

Detailed reference will now be made to one or more potential embodiments of the disclosure, which are illustrated in FIGS. 1 through 4.

The rigid hose for wet dry vacuum 100 (hereinafter invention) is a mechanical structure. The invention 100 is configured for use with the hose 131 of a domestic appliance 103. The invention 100 is a protective structure. The invention 100 protects the hose 131. The invention 100 sets the hose 131 in a fixed position such that the curvature of the center axis of the prism structure of the hose 131 will not shift during the use of the hose 131. The invention 100 comprises a bimodal shell 101. The bimodal shell 101 is a bimodal flexible structure. In the first potential embodiment of the disclosure, the hose 131 is integrated into the bimodal shell 101 such that the bimodal shell 101: a) forms a protected space that encloses the hose 131 and prevents the hose 131 from kinking when in use; and, b) forms a non-Euclidean prism structure that maintains the center axis of the prism structure of the hose 131 in a fixed position.

The domestic appliance 103 is an appliance that is commonly found in a household. This disclosure assumes that the domestic appliance 103 is a wet-dry vacuum 132. The hose 131 is a prism-shaped structure that attaches to the domestic appliance 103. The hose 131 form a fluid path used to create suction that pulls debris on a surface into the domestic appliance 103. The terms wet-dry vacuum 132, domestic, and appliance are defined elsewhere in this disclosure.

The bimodal shell 101 forms the primary structure of the invention 100. In the first potential embodiment of the disclosure, the bimodal shell 101 forms a protective shell that encloses the hose 131 of the domestic appliance 103. The bimodal shell 101 is a bimodal flexible structure. The bimodal flexible structure is defined elsewhere in this disclosure. The bimodal shell 101 has a prism structure. The bimodal shell 101 is a flexible structure with an inelastic nature. The bimodal shell 101 can bend into a non-Euclidean prism structure.

The hose 131 of the domestic appliance 103 inserts into the bimodal shell 101 such that the center axis of the prism structure of the hose 131 aligns with the non-Euclidean shape of the center axis 142 of the bimodal shell 101. The bimodal shell 101 holds the hose 131 in a fixed shape for as long as the bimodal shell 101 is not subjected to an external deforming force.

In the first potential embodiment of the disclosure, the bimodal shell 101 comprises a conduit structure 111.

The conduit structure 111 is a mechanical structure. The conduit structure 111 forms the bimodal flexible structure of the bimodal shell 101. The conduit structure 111 has a prism-shaped structure. The conduit structure 111 is formed as a composite prism. The conduit structure 111 acts as a rigid structure when the conduit structure 111 is subject to a radial force, relative to the center axis 142 of the composite prism structure of the conduit structure 111, that is in a direction that is radial to the center axis 142 of the bimodal shell 101. The conduit structure 111 acts as a semi-rigid structure with an inelastic nature when a deforming force is applied to the conduit structure 111 that is in a direction that is not radial to the center axis 142 of the bimodal shell 101 thereby bending the center axis 142 of the bimodal shell 101 into a non-Euclidean prism shape.

The conduit structure 111 is defined and described elsewhere in this disclosure.

The conduit structure 111 further comprises a plurality of rigid tubes 141, a center axis 142 of the bimodal shell 101, and an exterior surface 143 of the bimodal shell 101.

Each of the plurality of rigid tubes 141 is a hollow prism-shaped structure. Each of the plurality of rigid tubes 141 are geometrically similar to each other. Each of the plurality of rigid tubes 141 is a rigid structure.

A second rigid tube structure selected from the plurality of rigid tubes 141 inserts into a first rigid tube structure selected from the plurality of rigid tubes 141 such that the cant between the center axis of the second rigid tube structure and the center axis of the first rigid tube structure is adjustable. Each of the plurality of rigid tubes 141 are joined in a similar manner to form a daisy chain structure that forms both the conduit structure 111 and the bimodal shell 101. When joined in this manner, the plurality of rigid tubes 141 forms a rigid structure when subjected to a force that is radial to the center axis 142 of the bimodal shell 101 while simultaneously forming a semi-rigid structure with an inelastic nature when subjected to a deforming force that is not radial to the center axis 142 of the bimodal shell 101.

The center axis 142 of the bimodal shell 101 is both the center axis of the non-Euclidean composite prism structure of the conduit structure 111 and the center axis of the of the non-Euclidean composite prism structure of the bimodal shell 101 that is formed from the plurality of rigid tubes 141.

The exterior surface 143 of the bimodal shell 101 is both the exterior surface center axis of the non-Euclidean composite prism structure of the conduit structure 111 and the exterior surface of the bimodal shell 101 that is formed from the plurality of rigid tubes 141.

In a second potential embodiment of the disclosure, the invention 100 further comprises a plurality of c-clips 102. The plurality of c-clips 102 form a mechanical structure that attaches the hose 131 of the domestic appliance 103 to The plurality of c-clips 102 attach to the exterior surface 143 of the bimodal shell 101. The hose 131 attaches to the plurality of c-clips 102 such that the center axis of the prism structure of the hose 131 follows the same non-Euclidean shape that is formed by the center axis 142 of the bimodal shell 101.

The plurality of c-clips 102 comprises a collection of individual c-clips 121. Each individual c-clip 121 attaches to the exterior surface 143 of the bimodal shell 101. Each individual c-clip 121 is a fastening structure. Each individual c-clip 121 attaches the hose 131 to the bimodal shell 101 such that the hose 131 remains in a fixed position relative to the center axis 142 of the bimodal shell 101.

The hose 131 of the domestic appliance 103 inserts into each individual c-clip 121 of the plurality of c-clips 102 such that the center axis of the prism structure of the hose 131 is geometrically similar to the non-Euclidean shape of the center axis 142 of the bimodal shell 101. The hose 131 of the domestic appliance 103 inserts into each individual c-clip 121 of the plurality of c-clips 102 such that the center axis of the prism structure of the hose 131 follows a path parallel to the non-Euclidean shape of the center axis 142 of the bimodal shell 101. An individual c-clip 121 is defined elsewhere in this disclosure.

Each individual c-clip 121 selected from the plurality of c-clips 102 acts as a spring. Specifically, when a hose 131 inserts into the hollow interior of any selected individual c-clip 121 such that the lateral face of the prism-shaped structure of the individual c-clip 121 deforms in a direction such that the inner diameter of the prism structure of the selected individual c-clip 121 increases. The deformation of the lateral face of the prism-shaped structure of each individual c-clip 121 selected from the plurality of c-clips 102 applies a counter force that attempts to return the selected individual c-clip 121 to its original positions. When the hose 131 inserts into any selected individual c-clip 121, the individual c-clip 121 applies a pressure against the hose 131 that effectively attaches the individual c-clip 121 selected from the plurality of c-clips 102 to the hose 131.

Each individual c-clip 121 is a fastening structure. Each individual c-clip 121 attaches the hose 131 to the bimodal shell 101 such that the hose 131 remains in a fixed position relative to the center axis 142 of the bimodal shell 101.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

And/Or: As used in this disclosure, the term and/or is a grammatical conjunction that implies the logical function known as the inclusive or. Specifically, the term and/or implies that at least one and potentially more than one of the plurality of statements joined by the and/or conjunction will be true.

Appliance: As used in this disclosure, an appliance is a device or instrument intended to perform a single task.

Armor: As used in this disclosure, armor refers to a rigid structure used to form a guard that creates a protected space.

Bimodal Flexible Structure: As used in this disclosure, a bimodal flexible structure is a structure that: a) responds to forces that are applied to one or more dimensional axes of the bimodal flexible structure in the manner of a rigid structure; while, b) simultaneously responding to forces that are applied to a dimensional axis that is perpendicular to the one or more dimensional axes described in (a) in the manner of a semi-rigid structure with an inelastic nature. A conduit structure is an example of a bimodal flexible structure. Specifically, a conduit structure acts as a rigid structure to forces that are applied in a radial direction towards the center axis of the prism structure of the conduit structure while being allowing the prism structure of the conduit to bend such that the conduit can be shaped into a non-Euclidean prism.

C-Clip: As used in this disclosure, a C-clip is a fastening device that is formed in the shape of a hollow prismatic bifurcation. The congruent ends of the base prism shape that forms the C-clip forms a C shape or a U shape. The lateral face of the base prism shape that forms the C-clip is formed as an elastic structure. When an object is inserted into the hollow interior of the C-clip, a force is applied to the lateral face of the C-clip such that the C-clip the force elastically deforms in a direction that increases the inner diameter of the C-clip. The C-clip resists the application of the force by attempting to return to its relaxed shape. The C-clip stores the energy deformation such that when the force is no longer applied the cantilever V spring returns to its relaxed shape. This stored energy applies a pressure to the object that secures the object in position within the C-clip. The C-clip is also referred to as a circlip or a snap ring.

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Clip: As used in this disclosure, a clip is a fastener that attaches to an object by gripping or clasping the object. A clip is typically spring loaded.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Conduit Structure: As used in this disclosure, a conduit structure is an armor structure. The armor structure formed by the conduit structure protects the hollow interior of the conduit structure. The conduit structure forms a flexible hollow tubular prism-shaped structure. The conduit structure is a composite prism structure formed from a plurality of rigid tubular structures. Any first rigid tubular structure selected from the plurality of rigid tubular structures inserts into a second rigid tubular structure such that the second rigid tubular structure rotates relative to the first rigid tubular structure in a manner that allows a cant to be formed between the center axis of the first rigid tubular structure and the center axis of the second rigid tubular structure. Each of the plurality of rigid tubular structures are assembled as a daisy chain in the manner described above. The rigid nature of each of the plurality of rigid tubular structures protects the interior structure of the conduit structure from radial forces that are applied directly to any rigid tubular structure selected from the plurality of rigid tubular structures. The ability any two rigid tubular structures selected from the plurality of rigid tubular structures to rotate relative to each other provides the conduit with a flexible nature that allows the conduit structure to form a non-Euclidean prism structure by curving the center axis of the composite prism structure. The conduit structure is considered a flexible structure with an inelastic nature. The modulus of deformation of the flexible nature of the conduit structure is controlled by controlling the friction caused by the rotation of the second rigid tubular structure within the first rigid tubular structure. The conduit structure is an example of a bimodal flexible structure.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Daisy Chain: As used in this disclosure, daisy chain is a term that describes a series of objects that are linked together in a linear fashion. When referring to an electrical circuit, a daisy chain refers to a collection of electrical circuits interconnected using a series circuit.

Debris: As used in this disclosure, debris refers to an accumulation of loose and unwanted material on a surface.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk.

In this disclosure, the congruent ends of the prism-shaped structure that forms the disk are referred to as the faces of the disk.

Domestic Item: As used in this disclosure, a domestic item is an object that is commonly found within a household.

Elastic: As used in this disclosure, an elastic is a material or object that deforms when a force is applied to it and that is able to return to its relaxed shape after the force is removed. A material that exhibits these qualities is also referred to as an elastomeric material. A material that does not exhibit these qualities is referred to as inelastic or an inelastic material.

Elastic Nature: As used in this disclosure, an elastic nature refers to a flexible structure that returns to its relaxed shape after the flexible structure has been deformed.

Flexible: As used in this disclosure, flexible refers to an object or material that will deform when a force is applied to it but that will not necessarily return to its original shape when the deforming force is removed.

Form Factor: As used in this disclosure, the term form factor refers to the size and shape of an object.

Friction: As used in this disclosure, friction refers to a force that occurs between two objects that are in motion while in contact with each other. The force resists the relative motion of the two objects. More technically, friction refers to an exchange of energy between two objects that are in contact with each other that converts the energy of a directed relative motion between the two objects into randomly directed motions of the molecules that form both objects.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1.

Hose: As used in this disclosure, a hose is a flexible hollow prism-shaped device that is used for transporting liquids and gases. When referring to a hose in this disclosure, the terms inner dimension and outer dimension are used as they would be used by those skilled in the plumbing arts.

Inelastic Nature: As used in this disclosure, an inelastic nature refers to a flexible structure that maintains its new shape after the flexible structure has been deformed.

Inner Dimension: As used in this disclosure, the term inner dimension describes the span from a first inside or interior surface of a container to a second inside or interior surface of a container. The term is used in much the same way that a plumber would refer to the inner diameter of a pipe.

Modulus: As used in this disclosure, the modulus of an elastomeric structure is a function that describes the resistance to the deformation of the elastomeric structure as a function of the force applied to the elastomeric structure. When comparing modulus, a larger modulus is taken to imply a greater force is required to achieve the same deformation.

Negative Space: As used in this disclosure, negative space is a method of defining an object through the use of open or empty space as the definition of the object itself, or, through the use of open or empty space to describe the boundaries of an object.

Non-Euclidean Prism: As used in this disclosure, a non-Euclidean prism is a prism structure wherein the center axis of the prism lies on a non-Euclidean plane or is otherwise formed with a curvature.

Non-Euclidean Structure: As used in this disclosure, a non-Euclidean structure is a structure wherein an axis of the structure lies on a non-Euclidean plane or is otherwise formed with a curvature.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Outer Dimension: As used in this disclosure, the term outer dimension describes the span from a first exterior or outer surface of a tube or container to a second exterior or outer surface of a tube or container. The term is used in much the same way that a plumber would refer to the outer diameter of a pipe.

Perimeter: As used in this disclosure, a perimeter is one or more curved or straight lines that bounds an enclosed area on a plane or surface. The perimeter of a circle is commonly referred to as a circumference.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Protected Space: As used in this disclosure, a protected space is a space formed by a boundary structure. The boundary structure forms a barrier that protects objects within the protected space from potential dangers from the other side of the boundary.

Radial: As used in this disclosure, the term radial refers to a direction that: 1) is perpendicular to an identified central axis; or, 2) projects away from a center point.

Relaxed Shape: As used in this disclosure, a structure is considered to be in its relaxed state when no shear, strain, or torsional forces are being applied to the structure.

Rigid Structure: As used in this disclosure, a rigid structure is a solid structure formed from an inelastic material that resists changes in shape. A rigid structure will permanently deform as it fails under a force.

Semi-Enclosed Prism: As used in this disclosure, a semi-enclosed prism is a prism-shaped structure wherein a portion of the lateral face of the prism-shaped is removed or otherwise replaced with a negative space. Always use negative space.

Semi-Rigid Structure: As used in this disclosure, a semi-rigid structure is a solid structure that is stiff but not wholly inflexible and that will deform under force before breaking. A semi-rigid structure may or may not behave with an elastic nature in that a semi-rigid structure need not return to its relaxed shape.

Suction: As used in this disclosure, suction refers to the generation of a vacuum that is used to transport a fluid.

Tube: As used in this disclosure, a tube is a hollow prism-shaped device formed with two open ends. The tube is used for transporting liquids and gases. The line that connects the center of the first congruent face of the prism to the center of the second congruent face of the prism is referred to as the center axis of the tube or the centerline of the tube. When two tubes share the same centerline they are said to be aligned. When the centerlines of two tubes are perpendicular to each other, the tubes are said to be perpendicular to each other. In this disclosure, the terms inner dimensions of a tube and outer dimensions of a tube are used as they would be used by those skilled in the plumbing arts.

Vacuum: As used in this disclosure, vacuum is used to describe a first space that contains gas at a reduced gas pressure relative to the gas pressure of a second space. If the first space and the second space are connected together, this pressure differential will cause gas from the second space to move towards the first space until the pressure differential is eliminated.

Vacuum Cleaner: As used in this disclosure, a vacuum cleaner is a domestic appliance that generates a suction used to remove debris from a surface. A "wet-dry vacuum" refers to a vacuum cleaner that: a) passes the removed debris through a water reservoir; and/or, b) is capable of removing fluid from a surface.

With respect to the above description, it is to be realized that the optimum dimensional relationship for the various components of the invention described above and in FIGS. 1 through 4 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

What is claimed is:

1. A protective structure comprising
a bimodal shell;
wherein the bimodal shell is a bimodal flexible structure;
wherein the protective structure is a mechanical structure;
wherein the protective structure is configured for use with a hose of a domestic appliance;
wherein the protective structure protects the hose;
wherein the protective structure sets the hose in a fixed position such that a curvature of a center axis of a prism structure of the hose will not shift during the use of the hose;
wherein the hose inserts through the bimodal shell such that the bimodal shell: a) forms a protected space that encloses the hose; and, b)
wherein the bimodal shell comprises a conduit structure;
wherein the conduit structure further comprises a plurality of rigid tubes, a center axis of the bimodal shell, and an exterior surface of the bimodal shell;
wherein a second rigid tube structure selected from the plurality of rigid tubes inserts into a first rigid tube structure selected from the plurality of rigid tubes such that a cant between the center axis of the second rigid tube structure and the center axis of the first rigid tube structure is adjustable;
wherein each of the plurality of rigid tubes form a daisy chain structure that forms both the conduit structure and the bimodal shell.

2. The protective structure according to claim 1
wherein the hose is a prism-shaped structure that attaches to the domestic appliance;
wherein the hose forms a fluid path used to create suction that pulls debris on a surface into the domestic appliance.

3. The protective structure according to claim 2
wherein the bimodal shell forms a primary structure of the protective structure;
wherein the bimodal shell forms a protective shell that encloses the hose of the domestic appliance;
wherein the bimodal shell has a prism structure;
wherein the bimodal shell is a flexible structure with an inelastic nature;
wherein the bimodal shell can bend into a non-Euclidean prism structure.

4. The protective structure according to claim 3
wherein the hose of the domestic appliance inserts into the bimodal shell such that the center axis of the prism structure of the hose aligns with the non-Euclidean shape of the center axis of the bimodal shell;
wherein the bimodal shell holds the hose in a fixed shape.

5. The protective structure according to claim 4
wherein the conduit structure is a mechanical structure;
wherein the conduit structure forms the bimodal flexible structure of the bimodal shell.

6. The protective structure according to claim 5
wherein each of the plurality of rigid tubes is a hollow prism-shaped structure;
wherein the center axis of the bimodal shell is both the center axis of the non-Euclidean composite prism structure of the conduit structure and the center axis of the of the non-Euclidean composite prism structure of the bimodal shell that is formed from the plurality of rigid tubes.

7. The protective structure according to claim 6
wherein each of the plurality of rigid tubes are geometrically similar to each other;
wherein each of the plurality of rigid tubes is a rigid structure.

8. The protective structure according to claim 7 wherein the plurality of rigid tubes forms a rigid structure when subjected to a force that is radial to the center axis of the bimodal shell while simultaneously forming a semi-rigid structure with an inelastic nature when subjected to a deforming force that is not radial to the center axis of the bimodal shell.

9. The protective structure according to claim 2
wherein the bimodal shell forms a primary structure of the protective structure;
wherein the bimodal shell has a prism structure;
wherein the bimodal shell is a flexible structure with an inelastic nature;
wherein the bimodal shell can bend into a non-Euclidean prism structure.

10. The protective structure according to claim 9 wherein the bimodal shell holds the center axis of the hose in a fixed shape.

11. The protective structure according to claim 10
wherein the protective structure further comprises a plurality of c-clips;
wherein the plurality of c-clips form a mechanical structure that attaches the hose of the domestic appliance to the plurality of c-clips attach to the exterior surface of the bimodal shell.

12. The protective structure according to claim 11 wherein the hose attaches to the plurality of c-clips such that the center axis of the prism structure of the hose follows a same non-Euclidean shape that is formed by the center axis of the bimodal shell.

13. The protective structure according to claim 12
wherein the plurality of c-clips comprises a collection of individual c-clips;
wherein each individual c-clip is a fastening structure;

wherein each individual c-clip attaches the hose to the bimodal shell such that the hose remains in a fixed position relative to the center axis of the bimodal shell.

14. The protective structure according to claim 13
wherein the plurality of c-clips comprises a collection of individual c-clips;
wherein each individual c-clip attaches the hose to the bimodal shell such that the hose remains in a fixed position relative to the center axis of the bimodal shell;
wherein the hose of the domestic appliance inserts into each individual c-clip of the plurality of c-clips such that the center axis of the prism structure of the hose is geometrically similar to the non-Euclidean shape of the center axis of the bimodal shell;
wherein the hose of the domestic appliance inserts into each individual c-clip of the plurality of c-clips such that the center axis of the prism structure of the hose follows a path parallel to the non-Euclidean shape of the center axis of the bimodal shell.

15. The protective structure according to claim 14
wherein the bimodal shell comprises a conduit structure;
wherein the conduit structure is a mechanical structure;
wherein the conduit structure forms the bimodal flexible structure of the bimodal shell.

16. The protective structure according to claim 15
wherein the conduit structure has a prism-shaped structure;
wherein the conduit structure is formed as a composite prism;
wherein the conduit structure acts as a rigid structure when the conduit structure is subject to a radial force that is in a direction that is radial to the center axis of the bimodal shell;
wherein the conduit structure acts as a semi-rigid structure with an inelastic nature when a deforming force is applied to the conduit structure that is in a direction that is not radial to the center axis of the bimodal shell thereby bending the center axis of the bimodal shell into a non-Euclidean prism shape.

17. The protective structure according to claim 16
wherein each of the plurality of rigid tubes are geometrically similar to each other;
wherein each of the plurality of rigid tubes is a rigid structure.

18. The protective structure according to claim 17
wherein the plurality of rigid tubes forms a rigid structure when subjected to a force that is radial to the center axis of the bimodal shell while simultaneously forming a semi-rigid structure with an inelastic nature when subjected to a deforming force that is not radial to the center axis of the bimodal shell.

* * * * *